3,150,006
SYSTEM FOR CONTINUOUSLY DISSOLVING DEXTROSE
Robert L. Opila, Westchester, Ill., assignor to Corn Products Company, New York, N.Y., a corporation of Delaware
No Drawing. Filed June 11, 1962, Ser. No. 201,287
6 Claims. (Cl. 127—63)

Alpha-dextrose hydrate or anhydrous alpha-dextrose is normally dissolved in commercial applications by adding a given amount of dextrose to a specified quantity of water to prepare a solution of desired gravity. This is a time consuming operation, because of the slow rate of solution of alpha-dextrose hydrate or anhydrous alpha-dextrose. Because of the high heats of solution of dextrose, heat from an external source must be supplied to the system to maintain the temperature of the mixture of solution and undissolved dextrose. Since a time of 3–5 hours is required at an elevated temperature, the color of the resulting dextrose solution increases to an undesirable degree.

The time required to obtain a 50 percent aqueous solution at 25° C. of alpha-dextrose hydrate or anhydrous alpha-dextrose is 360 minutes, starting with dry materials that have been screened through a 20-mesh U.S. series sieve and retained on a 30-mesh U.S. series sieve. Sucrose of the same particle size requires 2.3 minutes to obtain a 50 percent solution.

It is well known in the art that the rate of solution of anhydrous dextrose can be increased by increasing the fraction of anhydrous dextrose in the beta form. Thus, the time required to prepare a solution containing 50 percent dry substance is shortened to 5 minutes if 40 percent of the anhydrous dextrose is in the beta form. Anhydrous dextrose, containing a large fraction of beta-dextrose, has never become an important item of commerce because of the inherent instability of this form of dextrose, since the presence of trace amounts of water in the dextrose results in the rapid transition of dextrose from the beta to the alpha form, thereby reducing the rate of solution of the dextrose mixture. Accordingly, the common items of commerce are alpha-dextrose hydrate and anhydrous alpha-dextrose, both materials having low rates of solution.

In addition to the difference in the rates of solution for sucrose and dextrose, the heats of solution are radically different. The heats of solution for alpha-dextrose hydrate, anhydrous alpha-dextrose, and sucrose are 25.2 calories per gram at 25.07° C., 14.1 calories per gram at 25.2° C. and 3.86 calories per gram at 23° C., respectively. (C.I.R.F. Critical Data Tables, pp. 166–167.) The temperature at which the mixture is maintained will, of course, determine the concentration of dry substance in solution. The solubility of dextrose and sucrose in water are compared below:

| Temperature, ° F. | Percent dextrose in solution [a] | Form of solid phase [a] | Percent sucrose in solution [b] |
|---|---|---|---|
| 33 | 35.2 | α-hydrate | 64.2 |
| 59 | 45.0 | do | 66.4 |
| 73.5 | 49.4 | do | 67.6 |
| 86 | 53.0 | do | 68.8 |
| 95 | 54.6 | do | 69.5 |
| 105 | 58.0 | do | 70.5 |
| 107 | 62.1 | do | 70.7 |
| 113 | 62.8 | do | 71.3 |
| 122 | 65.7 | do | 72.3 |
| 131 | 73.1 | α-anhydrous | 73.2 |
| 148 | 76.4 | do | 75.1 |
| 158 | 78.2 | do | 76.3 |
| 177 | 81.5 | do | 78.4 |
| 196 | 84.9 | do | 80.8 |

[a] C.I.R.F. Critical Data Tables, p. 191.
[b] Interpolated from data in Handbook of Chemistry and Physics, 6th edition, p. 1236.

Because of the difference in the properties of sucrose and alpha-dextrose hydrate, it is obvious that a method of implementation that is satisfactory for preparing solutions of sucrose will, in all probability, not be suitable for the preparation of solutions of dextrose.

The disadvantages of the commercial method for dissolving dextrose (high color) can be eliminated by taking advantage of the increasing rate of mutarotation with increasing temperature. Because of the higher rate of color development with increasing temperature, it is necessary to minimize the time during which the liquor is maintained at a high temperature. Therefore, the objects of my invention are to: reduce the time required to prepare a solution of dextrose; minimize the time the solution is maintained at an elevated temperature, thereby resulting in a dextrose solution of low color; and to develop a continuous system which will reduce the size of the apparatus employed in the preparation of a solution of dextrose.

The rate of mutarotation from alpha-dextrose to beta-dextrose increases as the temperature increases according to C. S. Hudson and J. K. Dale, Journal American Chemical Society, volume 39, p. 325 (91). This is the underlying principle used in the development of a continuous system for dissolving dextrose. My continuous system makes use of a blast heating, wherein a slurry of dextrose is pumped through a suitable steam mixing device where steam is injected directly into the slurry to heat the mixture to about 150° F. At this temperature the sugar dissolves in 3–4 seconds because of the increased rate of mutarotation from alpha-dextrose to beta-dextrose and the high rate of solution of a sugar high in beta-dextrose content. As a result of the heat required to obtain solution of the dextrose, the resulting solution is cooled to approximately 135° F.

My system consists of a tank to which water and sugar can be added and the suspension agitated. Although water at elevated temperatures can be used, unheated water is preferred to minimize color development of the sugar slurry. Some dissolution of the sugar will occur in the slurry tank but because of the low temperature of the water and the resulting cooling of the water by the dissolution of sugar, color development of the dextrose slurry is minimized.

The concentrated dextrose slurry is then pumped by means of a conventional centrifugal pump into a steam mixing device such as a conventional pipe T. The dextrose slurry is introduced into the T through the side outlet while the steam required to heat the slurry to the required temperature is introduced through an injection tube entering through one of the openings on the run of the T. The heated dextrose slurry is then discharged through the other outlet on the run of the T and thence is transported to the point of usage. The size of the pipe must be such that the fluid is in turbulent flow as defined by a Reynolds number [1] in excess of 3,000. Since the time required for dissolution to occur is 3–4 seconds, the transport system must be so designed as to incorporate a transport time of no less than 4 seconds. In most plant applications, this would require the installation of a pipeline approximately 40-feet long. As has been pointed out previously, the time required for a batch make-up system is 3–5 hours, during which time the dextrose liquor is maintained at an elevated temperature.

Dextrose solutions prepared in this continuous system had an average color (times 100) increase of about 0.3 unit (40° Baumé commercial basis), with a maximum observed color rise of 0.6 unit. Data obtained for sugar

[1] Reynolds number $$= \frac{D \text{ (pipe diameter)} \cdot v \text{ (velocity)} \cdot \rho \text{ (density of fluid at temperature of 150° F.)}}{\mu \text{ (viscosity of sugar slurry)}}$$

solutions prepared by the conventional batch means showed that the color increased 0.7 and 1.1 units for two batches.

The term "color" is defined as the corrected absorbance (optical density) at 450 millimicrons through 1 centimeter at a specified concentration, and is calculated in the following way:

Solution color (×100) 40° com'l Bé.

$$= \frac{(\text{Absorbance at 450 m}\mu - \text{Absorbance at 600 m}\mu)(\text{dilution factor})(100)}{\text{Cel length in cm.}}$$

The factor of 100 results in the conversion of absorbance to whole number values which are more readily differentiated. The solution concentration of 17.5° Baumé (60° F./60° F.) is selected because it results in absorbance values which fall within the most accurate range of the spectrophotometer and is sufficiently dilute to preclude crystallization of dextrose at room temperatures. The dilution factor converts the observed color at 17.5° Baumé (60° F./60° F.) to that of an approximately 40° commercial Baumé concentration of the original sample and is the ratio of the grams of dry substance per 100 milliliters of solution in a 17.5° Baumé (60° F./60° F.) solution and a 40° commercial Baumé concentration. In this case, the factor is three (3).

Because of the extreme difficulty in dispersing sugar at slurry concentrations of above 65 percent dry substance, the maximum concentration of dry substance in solution obtainable in this system is about 55 percent. The difference in concentrations for the slurry and solution is the result of the dilution of the dextrose solution caused by the condensation of the steam injected into the slurry.

Sugar liquors above 55 percent dry substance can be produced by recirculating liquor to the slurry tank resulting in a decrease in viscosity of the slurry-solution mixture. When the desired concentration is attained by continuous addition of sugar, a portion of the liquor can then be diverted to the point of utilization. A color increase of 2.8 units was obtained in the preparation of a dextrose liquor containing about 71 percent dry substance by means of this recycled system. No comparison can be made with commercial operation at this concentration, since the usual practice in commercial operations is not to exceed a concentration of about 55 percent.

Much of the prior art is devoted to the development of batch systems for the dissolution of sucrose, and these systems cannot be applied to dextrose without resulting in unfavorable color increases because of the basic differences in dextrose and sucrose. Some of the devices make use of complicated sparge tubes and coils which results in a high initial investment in comparison to the simple steam mixing device described herein.

The object of my invention for preparing dextrose solutions is not to obtain complete dissolution in the make-up tank, but to result in a sufficient reduction in slurry viscosity to permit agitation and pumping of the mixture of dextrose slurry and dextrose solution. An essential part of my invention is the introduction of steam into the dextrose slurry contained by the transport piping, the configuration of said piping being such so as to provide a holding time of 3–4 seconds, this being the time required to complete dissolution of dextrose.

The advantages of my invention are: the in-process material can be of small volume; a dextrose solution can be prepared as needed, thereby eliminating prolonged periods of storage; also the simplicity of the equipment used results in a minimized cost of fabrication.

Application of this invention is not limited to the preparation of dextrose solutions but is equally useful in the preparation of sucrose solutions.

My invention for producing sugar liquors is useful in plant applications where sugar is received in a solid form and is used in liquid form. The dry sugar can be converted to liquid sugar as needed without use of large heated storage tanks. Also, since my process involves a continuous system, the size of the process equipment required to produce a given amount of sugar liquor is reduced, resulting in a significant saving in capital expenditure.

I claim:

1. A continuous process for rapidly dissolving dextrose which comprises suspending dextrose in water and forming an aqueous slurry of dextrose, establishing a continuous flow of said slurry, said flow having a Reynolds number in excess of 3,000 so that said flow is turbulent, injecting steam into said continuous flow of said slurry to heat said slurry to about 150° F., and collecting the resultant solution of dextrose.

2. The process of claim 1 wherein said water in which said dextrose is suspended is unheated and wherein a portion of the slurry heated to about 150° F. is returned to the unheated, aqueous suspension of dextrose.

3. The process of claim 2 wherein the combined concentration of dissolved and undissolved dextrose is about 80 percent in the vessel which is used to suspend the slurry.

4. The process of claim 2 wherein the heated slurry discharged from the steam mixing device is held for a period of 3–4 seconds to complete dissolution of the undissolved dextrose and produce a dextrose liquor containing about 71 percent dry substance.

5. A continuous process for rapidly dissolving dextrose which comprises suspending dextrose in water and agitating the suspension to form a slurry containing about 65 percent dry substance, establishing a continuous flow of said slurry, said flow having a Reynolds number in excess of 3,000 so that said flow is turbulent, injecting steam into said continuous flow of said slurry to heat said slurry to about 150° F. and produce a dextrose liquor containing about 55 percent dry substance, and collecting the resultant dextrose liquor.

6. The process of claim 5 wherein the slurry is held for a period of 3–4 seconds at a temperature of about 150° F. to complete dissolution of the dextrose.

References Cited in the file of this patent

UNITED STATES PATENTS 2,929,747    Lippman _____ Mar. 22, 1960